United States Patent [19]

Bennett et al.

[11] 4,346,800
[45] Aug. 31, 1982

[54] APPARATUS FOR TURNING OVER CONVEYED ARTICLES

[75] Inventors: John D. Bennett; Brian Holmes, both of Leeds; David C. Morton, Harrogate, all of England

[73] Assignee: Baker Perkins Holdings Ltd., Peterborough, England

[21] Appl. No.: 148,931

[22] Filed: May 12, 1980

[30] Foreign Application Priority Data

May 30, 1979 [GB] United Kingdom ................ 7918743

[51] Int. Cl.³ ........................................... B65G 47/24
[52] U.S. Cl. .................................................. 198/412
[58] Field of Search ............................... 198/402–404, 198/406, 412–413, 415–416; 414/757, 774, 784

[56]  References Cited

U.S. PATENT DOCUMENTS 2,508,368  5/1930  Borkmann ........................... 198/415
4,122,938 10/1978  Walz et al. ........................... 198/411

Primary Examiner—Robert B. Reeves
Assistant Examiner—Douglas D. Watts
Attorney, Agent, or Firm—Watson, Cole, Grindle & Watson

[57] ABSTRACT

Apparatus for turning over a procession of articles of generally rectangular shape and having opposite longer and shorter sides, comprises a feed conveyor including pushers which engage successive articles in the procession to advance them in an upright condition along a dead plate, a support platform, disposed beyond the end of the dead plate, for supporting the undersurfaces of the articles as they leave the dead plate and continue to be advanced by the pushers, the support platform and the pushers having a relative movement effective to cause the articles to topple forwardly in succession from the support platform, and a support positioned to receive in a lying condition the articles toppling forwardly from the support platform at a level permitting further conveyance along it of the articles by the pushers.

6 Claims, 9 Drawing Figures

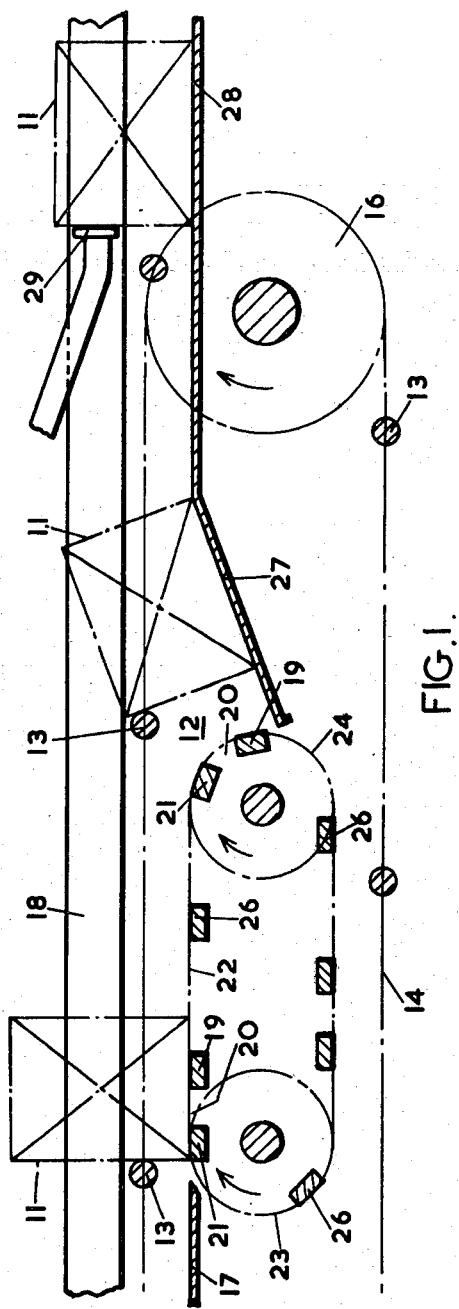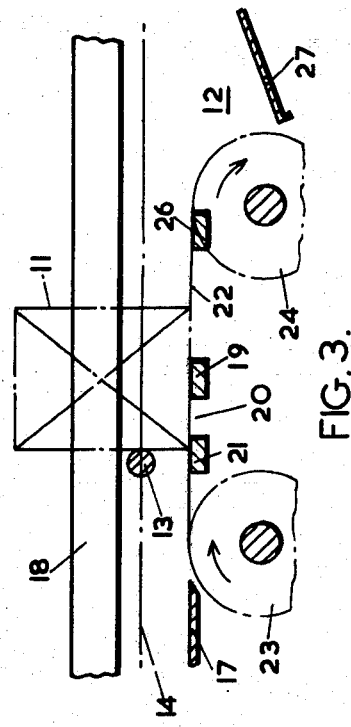
FIG.1.
FIG.3.

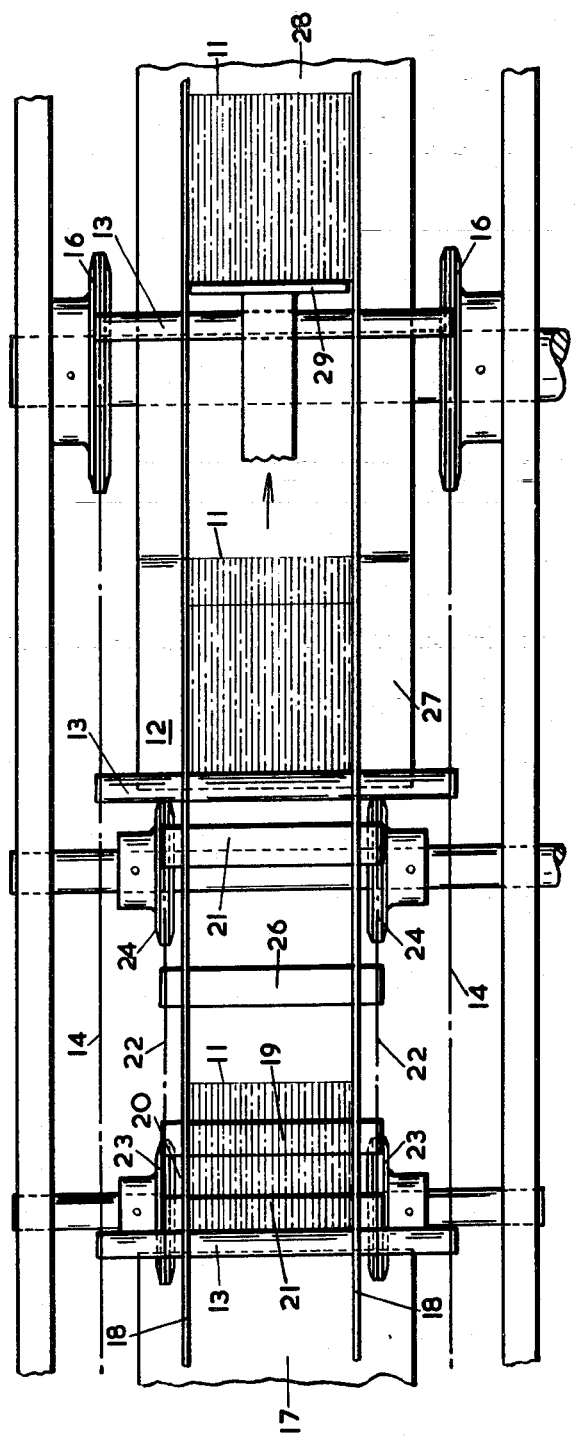

FIG. 7.

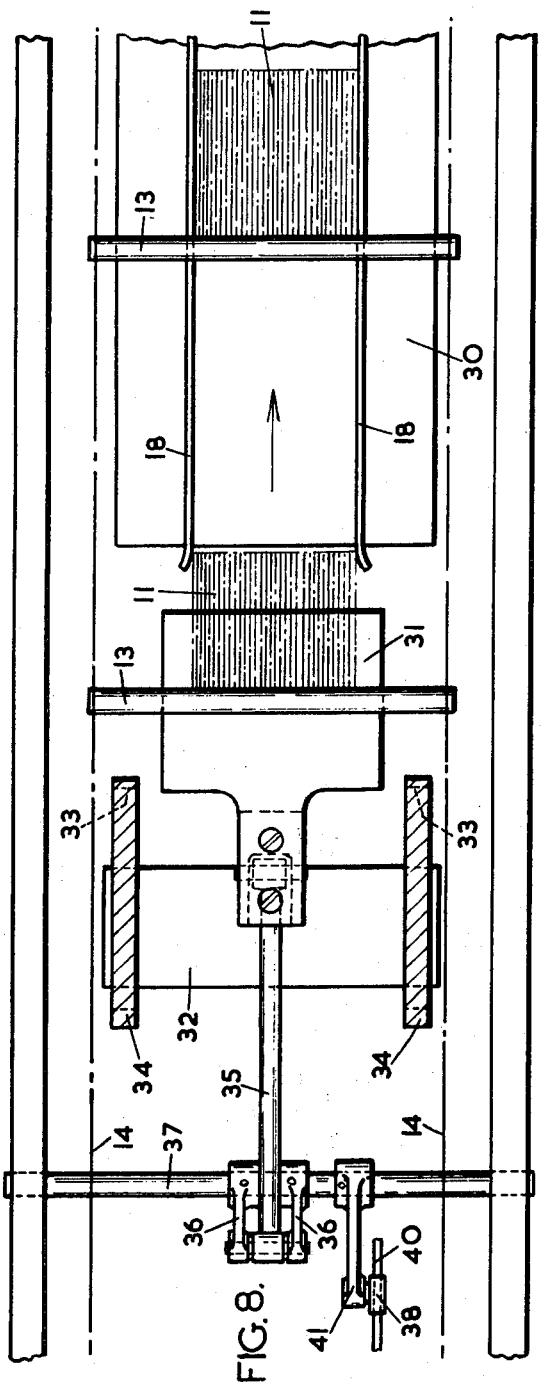
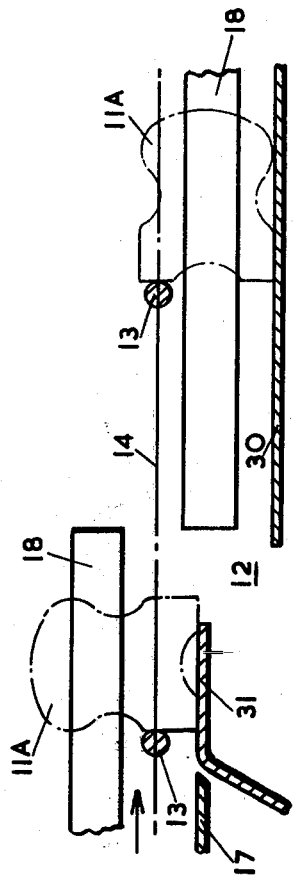
FIG. 8.
FIG. 9.

APPARATUS FOR TURNING OVER CONVEYED ARTICLES

This invention relates to an apparatus for turning over articles of generally rectangular shape and having opposite longer sides and opposite shorter sides in which they are first conveyed in an upright condition, supported on one of their shorter sides and are thereafter subjected to a forward turning action to a condition in which they are further conveyed in a lying position in which they are supported on one of their longer sides.

An apparatus of the above type is particularly useful for introducing batches of biscuits of such shape in desired orientation into a wrapping machine from a batch metering machine. Biscuits of this shape are generally delivered from the batch metering machine in the upright condition and it is also usual to transfer metered batches of biscuits into the wrapping machine in the lying condition. It is therefore necessary to turn the batches delivered from the metering machine from their upright condition to the lying condition before they enter the wrapping machine.

In a previously known apparatus for achieving this, which is described as prior art in U.S. Pat. No. 4,122,938, the batches are conveyed in an upright condition by a feed conveyor along a flat surface having a ramp which slopes upwardly in the direction of travel and which constitutes a discontinuity in the surface. Each batch is pushed up the ramp by the feed conveyor, and when its centre of gravity has reached a point beyond the edge of the ramp it falls forwardly and assumes a lying position on the portion of the surface beyond the ramp. The turned over batches are then further advanced by the feed conveyor towards a wrapping machine. This apparatus is however more difficult to operate at high speeds, e.g. over 120 turnover operations per minute, because of a tendency of the batches to remain in the upright condition as they fall from the end of the ramp due to their momentum.

In the improved apparatus described in U.S. Pat. No. 4,122,938, the ramp is eliminated and the discontinuity in the surface along which the batches of biscuits are advanced by the feed conveyor is constituted by a transverse gap in the surface. An overhead rotating member, driven in a closed path, strikes the rear face of each batch and effects in cooperation with the discontinuity, turning of the batch from its upright condition to the lying condition for further advance of the batch by the feed conveyor. If this apparatus is operated at high speed, the beating action of the rotating member may tend to damage the biscuits and difficulties are likely to be encountered in ensuring that the rotating member strikes the rear face of the batches at the precise moment when they engage the discontinuity in the surface, which is essential to produce the turning action of the batch.

It is an object of the present invention to provide a turnover apparatus of the above kind capable of operating effectively at high speed. The invention accordingly provides apparatus for turning over a procession of articles of generally rectangular shape and having opposite longer and shorter sides, comprising a feed conveyor including pushers which engage successive articles in the procession to advance them in an upright condition along a dead plate, supporting means, disposed beyond the end of the dead plate, for supporting the undersurfaces of the articles as they leave the dead plate and continue to be advanced by the pushers, the supporting means and the pushers having a relative movement effective to cause the articles to topple forwardly in succession from the supporting means, of a support positioned to receive in a lying condition the articles toppling forwardly from the supporting means at a level permitting further conveyance along it of said articles by said pushers.

In a preferred embodiment of the invention the supporting means is constituted by a chain conveyor, which is driven at a slower speed from the feed conveyor and includes a plurality of spaced platforms which individually support successive articles leaving the dead plate, the support being disposed beyond the end of the chain conveyor. Each such platform may be constituted by a pair of bars spaced in the direction of travel of the articles. The chain conveyor may include bars, disposed between the platforms, for supporting in an inclined position articles which have toppled forwardly under their own momentum as the result of stoppage of the apparatus.

In an alternative embodiment, the supporting means is constituted by a single reciprocating platform which supports in succession each of the articles leaving the dead plate.

Preferably the support is constituted by a ramp inclined upwardly in the direction of advance of the articles.

Two embodiments of the invention will now be described with reference to the accompanying diagrammatic drawings in which:

FIG. 1 is a sectional elevation showing the first embodiment,

FIG. 2 is a corresponding plan view,

Figure 7:
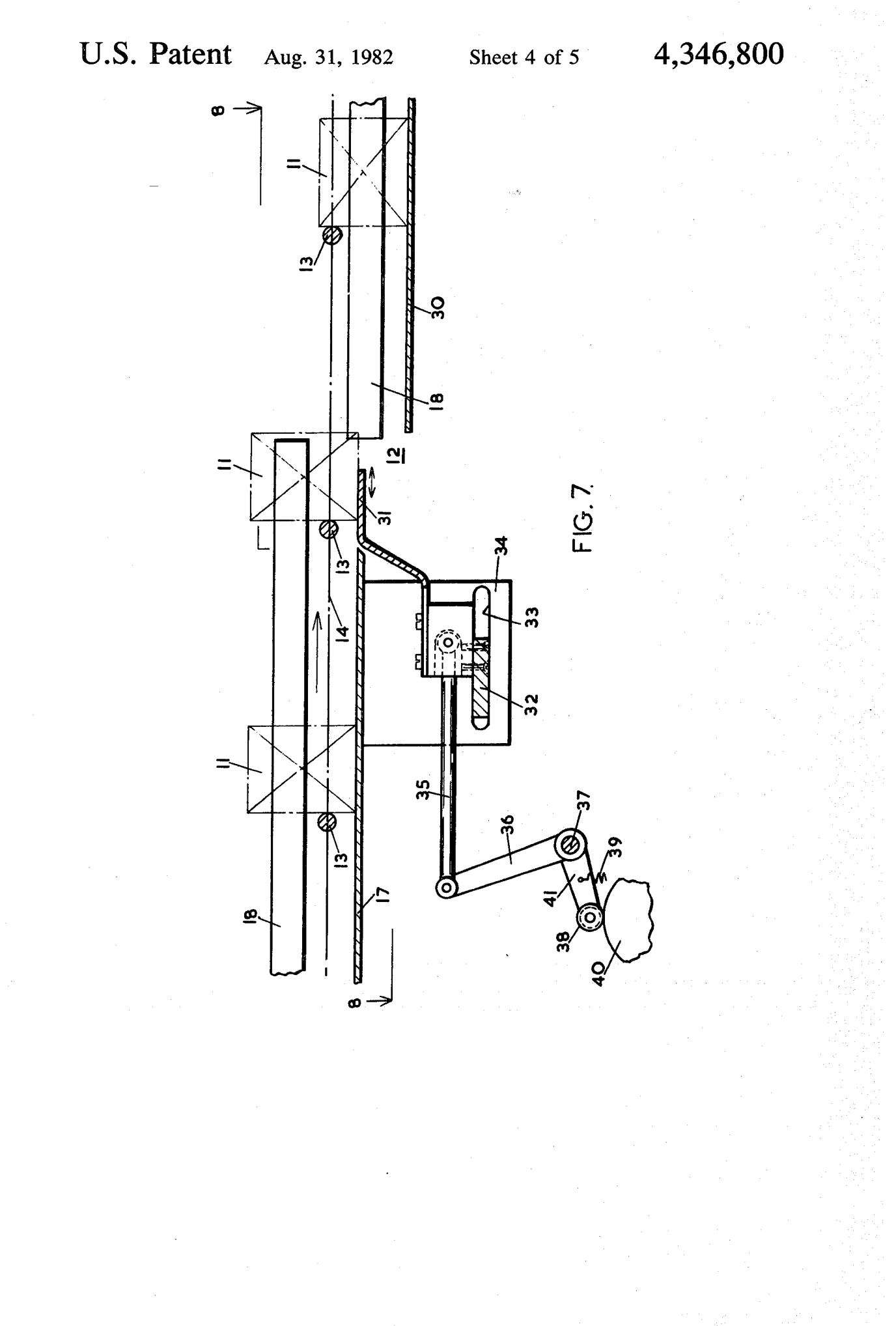
Figure 4:
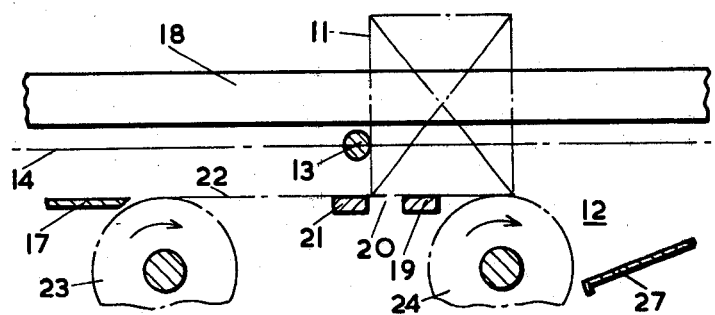

FIGS. 3, 4, 5 and 6 are views illustrating various stages in the operation of the apparatus shown in FIGS. 1 and 2, FIG. 7 is a sectional elevation showing the second embodiment, FIG. 8 is a view on the line 8—8 in FIG. 7, and FIG. 9 is a view illustrating use of the second embodiment with biscuits which are not of strictly rectangular shape.

Like reference numerals indicate like parts throughout the Figures.

As shown in FIGS. 1 and 2 batches 11 of rectangular shaped biscuits are transferred from a batch metering apparatus, for example of the kind described in British Specification No. 1379884 towards a turnover position 12 in an upright condition along a dead plate 17 by pusher bars 13 extending between and attached to a pair of continuously driven chains 14 mounted on sprockets 16. Side guides 18 are provided to control the batches 11 in their lengthwise direction.

As each batch 11 approaches the turnover position 12, it passes from the dead plate 17 on to one of a series of support platforms which supports the batch until it reaches the turnover position 12. Each platform is constituted by a leading bar 19 and a trailing bar 21, separated by a gap 20 for passage of fragments of biscuit. The bars 19 and 21 extend between and are attached to a pair of continuously driven chains 22 mounted on sprockets 23 and 24, the chains 22 being driven at a slower speed than the chains 14. In the example illustrated there are three support platforms 19,21 arranged at equi-spaced intervals on the chains 22 and auxiliary support bars 26 are attached to the chains 22 between the platforms.

Figure 5:
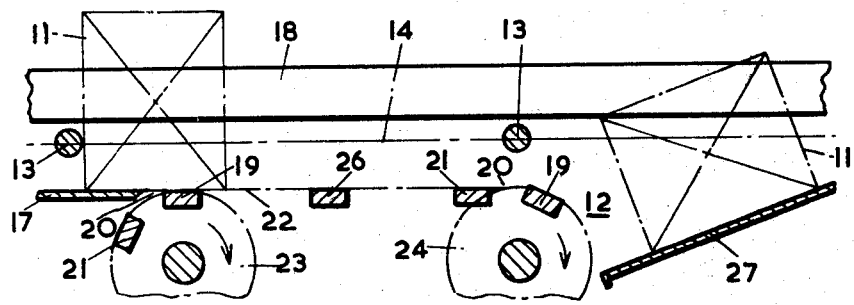

Beyond the sprockets 24 is a ramp 27, inclined upwardly in the direction of travel of the batches, on to which the batches 11 fall in succession, as described below and as shown in FIG. 5, and from which they are subsequently moved by the pusher bars 13 on to a delivery platform 28. As each pusher bar 13 commences its travel around the sprockets 16 a reciprocating pusher 29 engages the rear face of the batch 11 in advance of the pusher bar to transfer it from the delivery platform 28 to a wrapping mechanism (not shown) carrying with it a wrapper interposed into the path of movement of the batch into the wrapping mechanism.

In operation, succession batches 11 of biscuits are transferred by the pusher bars 13 from the dead plate 17 on to the support platforms 19 and 21 and, due to the slower rate of travel of the chains 22 in relation to that of the chains 14, continued movement of the pusher bars 13 causes each transferred batch to be pushed across the supporting face of its platform as shown in FIG. 3. The relative movement of the chains 14 and 24 is such that by the time a batch 11 arrives at the turnover position 12 the batch has been pushed forward until its centre of gravity has moved ahead of the leading edge of the bar 19, as shown in FIG. 4. The batch is now in an unstable condition and continued movement forward results in forward rotation of the batch about a horizontal axis until the longer sides of the biscuits in the batch come into contact with the ramp 27, as shown in FIG. 5, on which the batch remains until the pusher bar 13 catches up with the batch and transfers it on to the delivery platform 28.

Figure 6:
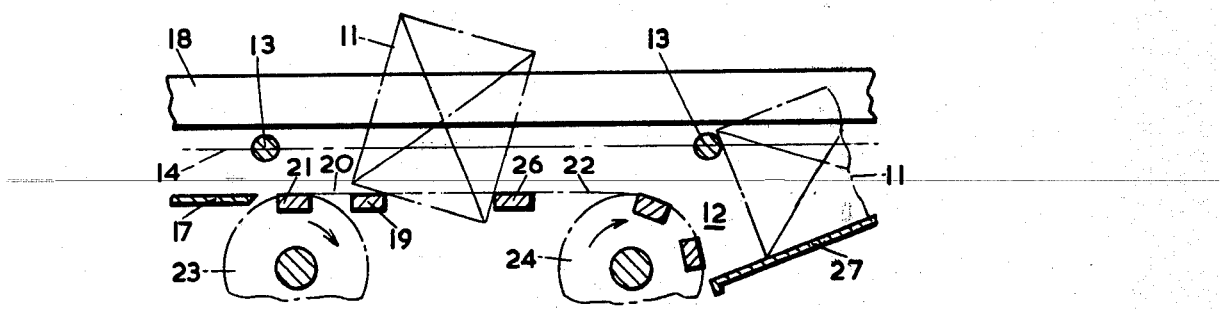

Upon stoppage of the apparatus a batch 11 in the process of being transported on a platform 19, 21 may topple forward as the result of its momentum. If this occurs the batch 11 will be supported between the bars 26 and 19, as shown in FIG. 6, and hence is prevented from falling further down. When the apparatus is restarted this batch will be transported to the turnover position 12 supported in this manner until the bar 26 passes around the sprockets 24, whereupon the batch 11 will fall on to the ramp 27 in correct orientation.

The embodiment shown in FIGS. 7 and 8 operates in generally the same fashion as that already described. The ramp 27, however, is replaced by a horizontal delivery plate 30 onto which the batches 11 fall in a lying position and along which they may be fed by the pushers 13. In addition, the chain conveyor and its support platforms are replaced by a single reciprocating platform 31 which operates to support each of the batches 11 as it moves off the dead plate 17. The platform 31 is mounted on a slide 32, the ends of which extend through horizontal slots 33 in brackets 34 extending downwardly from the dead plate 17. The slide 32 is connected by a connecting rod 35 to arms 36 mounted on a shaft 37, to which is fixed an arm 41 carrying a follower 38 which is maintained by a spring 39 in contact with a cam 40.

The platform 31 is thus reciprocated by the cam 40 in a horizontal path. The cam may be so shaped as to cause the platform 31 to advance at a slower rate than the pusher bars 13 to cause the batches 11 to be turned over and fall onto the plate 30 in the same fashion as in the embodiment of FIGS. 1-6. Alternatively the platform 31 may advance at the same speed as the pusher bars 13 and turnover of each batch be effected by retraction of the platform from beneath the batch.

While the apparatus has been described with reference to the conveying and turning over of batches of biscuits, it will be appreciated that the apparatus may be utilised for other rectangular shaped articles, such as cartons or packets of cigarettes, in cases when it is required to turn the articles from an upright condition to a lying position.

Also the apparatus can be used with biscuits which are not of strictly rectangular shape but have scalloped edges, provided the biscuits have a generally flat shorter edge enabling them to stand upright on the dead plate 17 and on the supporting means by which they are supported during the turning over operation. Thus the biscuits may have the shape indicated at 11A in FIG. 9.

We claim:

1. Apparatus for turning over a procession of articles of generally rectangular shape and having opposite longer and shorter sides, comprising a dead plate devoid of discontinuities, a continuously travelling feed conveyer including pushers which engage successive articles in the procession to advance them in an upright condition supported by their shorter undersurfaces along the dead plate, movable platform means, movable at a position aligned with the end of the dead plate to support said shorter undersurfaces of the articles as they leave the dead plate and continue to be advanced by the pushers, means for imparting to the platform means movement relative to the pushers which is effective to cause the articles to topple forwardly in succession under gravity alone from the platform means as the articles continue to be advanced by the pushers, and a support positioned to receive in a lying condition and supported by their longer undersurfaces the articles toppling forwardly from the supporting means at a level permitting further conveyance along it of said articles by said pushers.

2. Apparatus according to claim 1, wherein the platform means comprises a chain conveyor, a plurality of spaced platforms carried by the chain conveyor, the chain conveyor being disposed below the feed conveyor and being driven at a slower speed than the fed conveyor, said platforms individually supporting successive articles leaving the dead plate, and the support being disposed beyond the end of the chain conveyor.

3. Apparatus according to claim 2, wherein each said platform is constituted by a pair of bars spaced in the direction of travel of the articles.

4. Apparatus according to claim 2, wherein the chain conveyor carries bars, disposed between the platforms, for supporting in an inclined position articles which have toppled forwardly under their own momentum as the result of stoppage of the apparatus.

5. Apparatus according to claim 1, wherein the platform means comprises a single reciprocating platform which supports in succession each of the articles leaving the dead plate.

6. Apparatus according to claim 1, wherein the support comprises a ramp inclined upwardly in the direction of advance of the articles.

* * * * *